United States Patent [19]

Nakamoto et al.

[11] Patent Number: 4,718,926
[45] Date of Patent: Jan. 12, 1988

[54] EXHAUST GAS FILTER FOR DIESEL ENGINE

[75] Inventors: Mitsuyoshi Nakamoto, Nara; Takao Kusuda, Ashiya; Masaaki Yonemura, Nara; Koichi Shinmura, Nerima, all of Japan

[73] Assignee: Matsushita Electric Industrial Co., Ltd., Osaka, Japan

[21] Appl. No.: 837,768

[22] Filed: Mar. 10, 1986

[30] Foreign Application Priority Data

Mar. 8, 1985 [JP] Japan .................. 60-47195
Mar. 8, 1985 [JP] Japan .................. 60-47196

[51] Int. Cl.⁴ .............................. B01D 39/20
[52] U.S. Cl. .................. 55/523; 55/DIG. 10; 55/DIG. 30; 422/180
[58] Field of Search ......... 55/282, 466, 523, DIG. 10, 55/DIG. 30, 521, 390; 60/311; 422/176, 178, 180; 428/116; 210/317

[56] References Cited

U.S. PATENT DOCUMENTS

| | | | |
|---|---|---|---|
| 4,228,847 | 10/1980 | Lindahl | 55/390 X |
| 4,293,357 | 10/1981 | Higuchi et al. | 55/523 X |
| 4,340,403 | 7/1982 | Higuchi et al. | 55/DIG. 30 |
| 4,342,574 | 8/1982 | Fetzer | 55/523 X |
| 4,390,355 | 6/1983 | Hammond, Jr. et al. | 55/523 |
| 4,391,616 | 7/1983 | Imamura | 55/390 X |
| 4,410,427 | 10/1983 | Wydeven | 210/317 |
| 4,441,899 | 4/1984 | Takagi et al. | 55/DIG. 30 |
| 4,455,180 | 6/1984 | Hillman et al. | 55/DIG. 30 |
| 4,460,388 | 7/1984 | Fukami et al. | 55/521 X |
| 4,505,726 | 3/1985 | Takeuchi et al. | 55/DIG. 10 |
| 4,509,966 | 4/1985 | Dimick et al. | 55/DIG. 30 |
| 4,519,820 | 5/1985 | Oyobe et al. | 55/DIG. 30 |
| 4,521,532 | 6/1985 | Cho | 422/180 X |
| 4,559,193 | 12/1985 | Ogawa et al. | 55/523 X |
| 4,576,799 | 3/1986 | Wörner et al. | 55/DIG. 30 |
| 4,589,983 | 5/1986 | Wydevan | 55/521 X |

Primary Examiner—Robert Spitzer
Attorney, Agent, or Firm—Wenderoth, Lind & Ponack

[57] ABSTRACT

An exhaust gas filter for a diesel engine made by winding a composite sheet formed of a corrugated sheet and a flat sheet, the filter being provided with many narrow openings at the entrance or at the entrance and exit of the filter, wherein the area of the upstream side face is increased to deposit carbon soot on this face and on the entrance exhaust gas channels uniformly. By providing many grooves on the cell walls at the upstream direction, more carbon soot deposits in these grooves. Accordingly, the constitution permits reliable carbon soot ignition, complete carbon soot burn out with smaller quantities of carbon deposition as a whole.

18 Claims, 7 Drawing Figures

EXHAUST GAS FILTER FOR DIESEL ENGINE

BACKGROUND OF THE INVENTION

The present invention relates to exhaust gas filters, and more specifically, to an exhaust gas filter for use in a diesel engine, wherein carbon soot exhausted from the diesel engine is collected using a ceramic filter and is burned in said ceramic filter so that the volume of carbon soot discharged from the engine can be reduced.

In order to collect carbon soot exhausted from a diesel engine, the following exhaust gas filters for a diesel engine have conventionally been designed: a filter made from metal wire mesh coated with alumina, a foamed ceramic filter having a porous structure made by adding a foaming agent to the ceramic, a ceramic fiber mat, and a honeycomb shaped ceramic monolith filter. Of these filters, the honeycomb shaped ceramic monolith filter is approximately 90% efficient for soot collection and has a low pressure drop, therefore it is expected to be effective for removing carbon soot in exhaust gas. In general, a ceramic monoloth filter for diesel engine exhaust gas is of a honeycomb structure comprising a plurality of cells mainly composed of CORDIERITE and produced by an extrusion process. Every other opening at both opposite ends of the honeycomb cell structure, located at the upstream and downstream sides with respect to the direction of flow of the exhaust gas, is clogged with a material like cement, which has a very low porosity and is approximately 10 mm in length. That is, a cell channel clogged at the upstream side is opened at the downstream side and an adjacent cell channel is conversely clogged, so that each cell channel functions as either an entrance or exit channel for exhaust gas. As a result, substantially all of the carbon soot in the exhaust gas is collected on the cell walls. On the other hand, a pressure drop of exhaust gas at the filter increases with an increase in the carbon soot deposition on the filter and the engine performance is deteriorated. Accordingly, in order to maintain good engine performance, the filter regenerates itself by afterburning the deposited carbon soot after the quantity of deposited carbon soot reaches a predetermined value. There has been a long felt need for an exhaust gas filter for a diesel engine having a honeycomb structure, wherein deposited carbon soot is ignited and burns by propagation over the surfaces of the cell walls, to burn the soot up completely, and then, the filter is easily and repeatedly renewed.

SUMMARY OF THE INVENTION

To solve such a problem as described hereinabove, the present invention provides an exhaust gas filter for a diesel engine comprising a honeycomb structure made from porous ceramic having a plurality of cells, and a plurality of lugs are provided alternately at either the upstream or downstream end of said cells, and wherein a narrow opening is provided at the upstream end of the exhaust gas channels in said honeycomb structure.

In the present invention, a narrow opening is provided at each upstream end or downstream end of the exhaust gas channel in an exhaust gas filter for a diesel engine, and in addition, a plurality of grooves are provided at the upstream filter wall surface which is exposed to exhaust gas. The above described arrangement allows even small quantities of carbon soot deposition to reliably ignite, the subsequent combustion to propagate, and the soot to completely burn up.

BRIEF DESCRIPTION OF THE DRAWINGS

These and other objects and features of the present invention will become clear from the following description taken in conjunction with preferred embodiments thereof with reference to the accompanying drawings, in which.

DETAILED DESCRIPTION OF THE PREFERRED EMBODIMENTS

Figure 1:
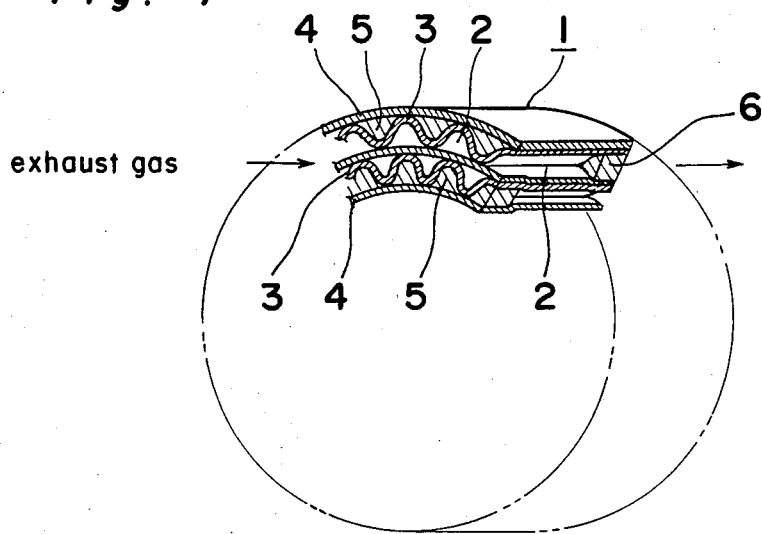
FIG. 1 is a fragmentary schematic perspective view showing an exhaust gas filter for a diesel engine according to an embodiment of the present invention.

Before the description of the present invention proceeds, it is to be noted that like parts are designated by like reference numerals throughout the accompanying drawings.

Figure 2:
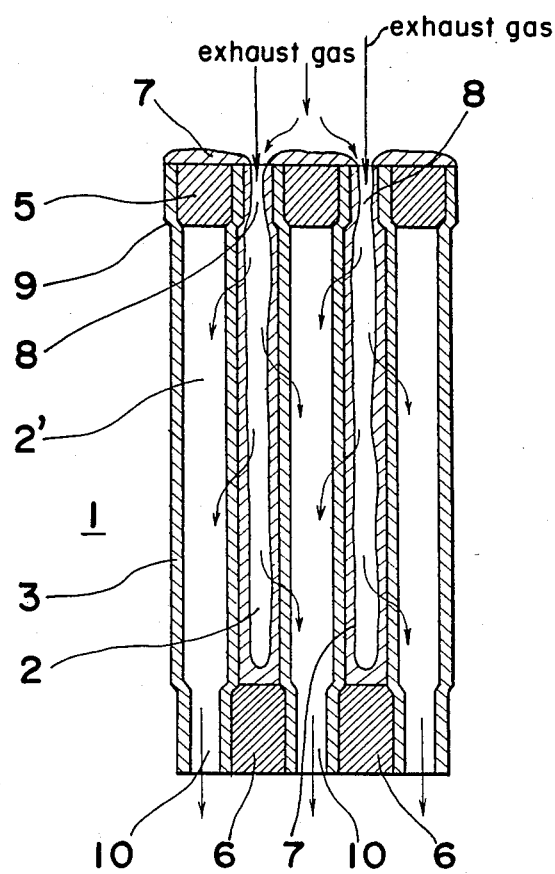
FIG. 2 is a sectional view showing an exhaust gas filter for a diesel engine according to an embodiment of the present invention.

FIGS. 1 and 2 are a fragmentary sectional perspective view and a sectional side view, respectively, showing an exhaust gas filter for a diesel engine according to one embodiment of the present invention. In FIG. 1, 1 is an exhaust gas filter; 2, is a channel for exhaust gas; 3, is a corrugated sheet; 4, is a flat sheet; and 5 and 6, are plugs for clogging each exhaust gas channel at either the upstream or the downstream side, respectively. FIG. 2 shows a condition, wherein the flat sheet 4 is removed, and 7 is the carbon soot deposit produced by the exhaust gas passage through the filter. An exhaust gas filter for a diesel engine is produced by the following steps. For example, 30 parts by weight of alumina fiber, cut in lengths shorter than 20 mm, and 16 parts by weight of ceramic bulk powder are suspended in 3000 parts by weight of water. Added to this mixed slurry is an organic binder, such as polyvinyl acetate, and then, the mixture is agglutinated by the addition of coagulant, such as, polyacrylamide. The coagulated slurry is made into sheets by a paper making machine. Next, the produced sheets are formed as corrugated sheets and as flat sheets which are bonded together into a composite sheet. The composite sheet is wound in overlapping layers around a core and joined with adhesives to form a honeycomb structure.

The same ceramic material (prepared as described below) is injected into either the entrance or the exit of each cell channel, whereby the channels are clogged or plugged in such a way that a cell channel clogged or plugged at the upstream end of the honeycomb structure is not clogged at the downstream end of the honeycomb structure. Every other cell channel formed by the spaces between the corrugated sheet and the flat sheet are clogged so that exhaust gas introduced into one cell channel passes through the cell wall separating adjacent cell channels and is transmitted to another cell channel, and then, is discharged from the honeycomb structure. The assembly is baked in air at 1250° C. to form an objective exhaust gas filter having a honeycomb structure. In this case, the plugs or clogging material is a paste made by calcining said sheet and adding starch and water. The paste is injected into each entrance and exit of the honeycomb structure and baked after drying. As shown in FIG. 2, a plug or clogging portion 5 at the entrance side of exhaust gas has a larger cross-sectional area than the exhaust gas channel 2. In order to accomplish this result, the plug or clogging material is pressed into said openings to expand the walls of the exhaust channels radially outwards to reduce the cross-sectional areas of the adjacent channels before baking the honeycomb assembly, or in another case, the plugs or clogging material is injected when the composite sheet is wound around the core, and then, the assembly is baked. Accordingly, the entrance opening of the exhaust gas channel at the upstream side is narrowed to form a narrow opening 8.

By the above described arrangement, exhaust gas flow resistance at the entrance increases and dynamic pressure of exhaust gas in the exhaust gas channel 2 decreases so that the carbon soot 7 deposits uniformly on the channel wall. Moreover, the filter can be sufficiently reactivated by afterburning. Since a large quantity of carbon soot 7 does not deposit in limited cells, there is no local overheating or filter breakdown. By constituting the plug or clogging portion 5 as described above, a step portion 9 of the corrugated sheet mainly supports pressure when strong exhaust pressure is applied to the clogging portion from the diesel engine, so that the plug or clogging portion does not break. The flat sheet also forms a step portion that functions in the same way as that of the corrugated sheet. Furthermore, by providing a plug or clogging portion 6 at the rearward exit of an exhaust gas channel which is not plugged or clogged at the upstream side entrance, to form a narrow opening 10 in an adjacent channel, carbon soot deposits more uniformly. The narrow opening 8 of the entrance can be reduced in dimension by providing the narrow opening 10 at the exit. The observation of carbon soot ignition reveals that the ignition begins at the upstream end of the filter 1 by means of high temperature particles contained in the exhaust gas or by igniting means such as a glow plug. Then, the carbon soot deposited on the exhaust channel 2 burns and the burning gradually propagates toward the rearward direction or direction of flow of exhaust gas.

Figure 3A:
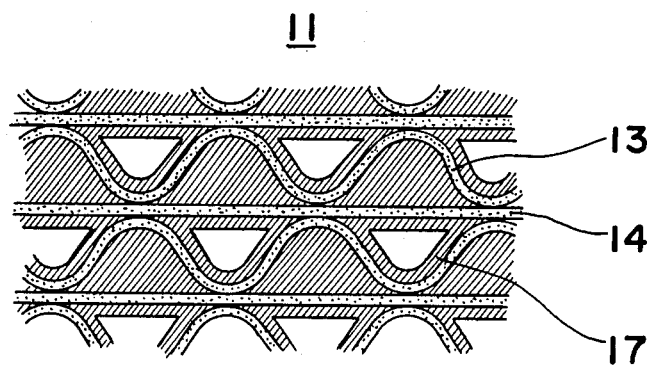
FIGS. 3(a) and 3(b) are sectional, top and side views showing an exhaust gas filter for a diesel engine according to another embodiment of the present invention.
Figure 3B:
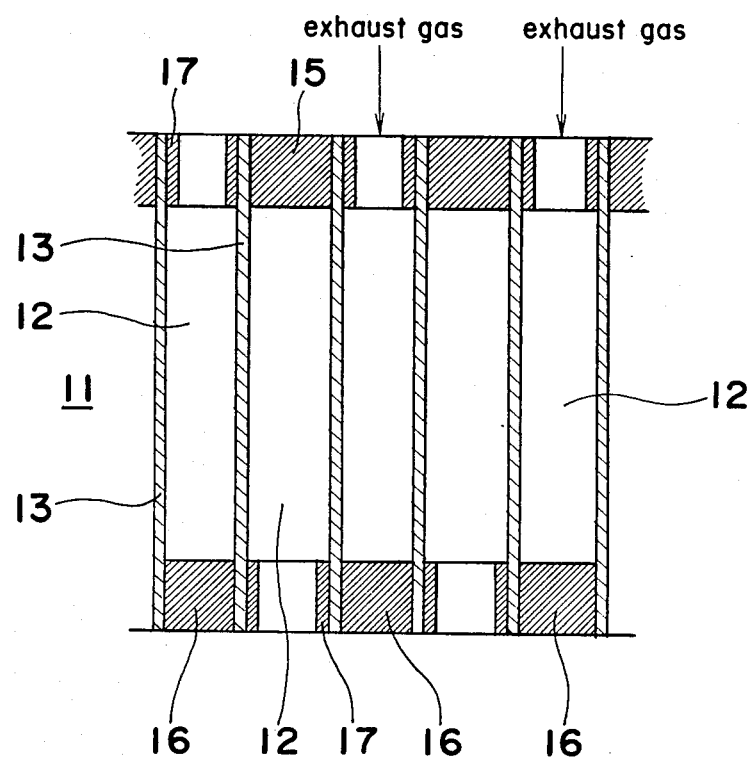

FIGS. 3(a) and 3(b) show a second embodiment of the present invention. FIG. 3(a) is a top view and FIG. 3(b) is a sectional side view. In these figures, 11 is an exhaust gas filter; 13 and 14 are a corrugated sheet and a flat sheet, respectively, and together they constitute a composite sheet forming the exhaust gas channels 12 with the spaces between the corrugated sheet 13 and the flat sheet 14; 15 and 16 are plugs or clogging portions at upstream and downstream sides, respectively, of the exhaust gas channel 12; and 17 is a tubular insert provided at the entrance of the upstream or downstream side of each exhaust gas channel, which forms a narrow opening, as shown in FIG. 3(b).

Figure 4:
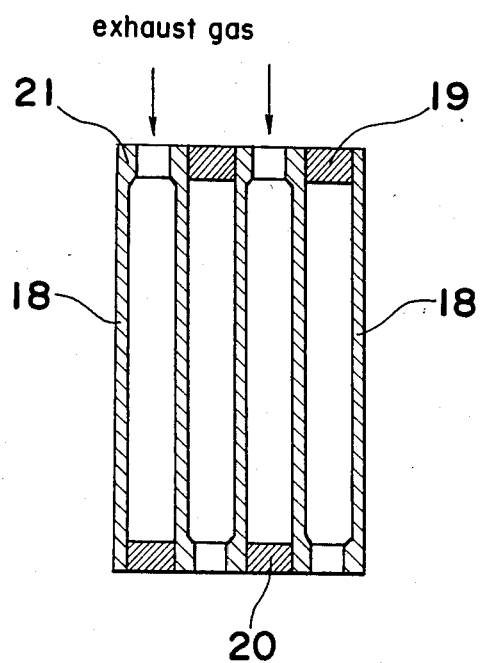
FIG. 4 is a sectional side view showing an exhaust gas filter for a diesel engine according to a further embodiment of the present invention.

FIG. 4 is a sectional view showing an exhaust gas filter according to a third embodiment of the present invention. As shown in this figure, a thick wall portion 21 is provided at one end of each exhaust gas channel by thickening each corresponding part of the corrugated sheet 18 and the flat sheet (not shown in the figure) surrounding a respective plug 19, instead of providing the tubular insert 17 shown in FIG. 3. In this figure, 19 and 20 are plugs or clogging portions at the entrance and exit sides of each exhaust gas channel, respectively.

Figure 5:
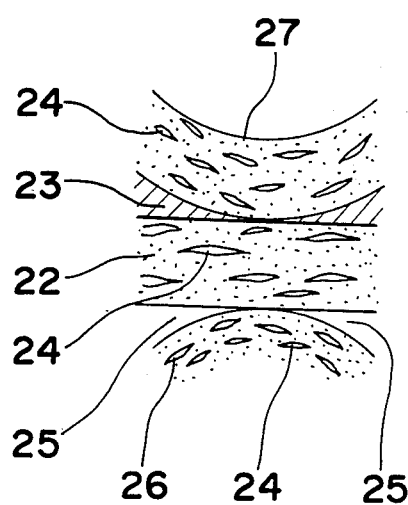
FIG. 5 is a sectional partial view showing an exhaust gas filter for a diesel engine according to still another embodiment of the present invention.
Figure 6:
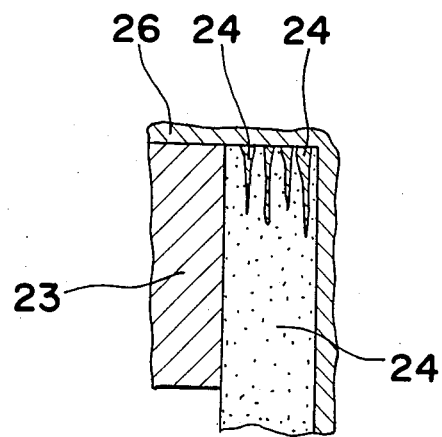
FIG. 6 is a fragmentary section view of FIG. 5.

FIG. 5 shows a fourth embodiment of the present invention. In this figure, 27 is a corrugated sheet and 22 is a flat sheet. These sheets comprise a composite sheet which forms a porous sintered body of ceramic fibers. A plurality of grooves 24 are provided on the porous sintered body by defibering the ceramic fiber layer or by rapid sintering of the honeycomb structure. FIG. 6 is a fragmentary sectional view of FIG. 5. In this figure, 26 is a deposited carbon soot layer; 23, is a plug or clogging portion; and 25, is an exhaust gas channel.

Referring now to FIGS. 1 and 2, the exhaust gas flow and the function of the exhaust gas filter are further described. The exhaust gas discharged from a diesel engine is introduced to the plug or clogging portion 5 at the upstream end, the upstream surfaces or the corrugated sheet 3 and the flat sheet 4, and the narrow openings 8 of the channels at the upstream end. Then, the exhaust gas flows into the exhaust gas channels 2 and is transmitted to the adjacent exhaust gas channels 2' through the corrugated sheet 3 and the flat sheet 4, and then, the gas is discharged from the narrow openings 10 located at the rearward end of the filter. The carbon soot contained in the exhaust gas deposits on the upstream end surface of the exhaust gas filter and on the exhaust gas channel walls at the upstream end.

In the embodiments shown in FIGS. 5 and 6, the carbon soot also deposits in the grooves 24, improving the filtering performance. That is, the deposited carbon soot ignites at the upstream end of the exhaust gas filter as described above, so that the deposited carbon soot is easily removed by burning. Next, the removal of deposited carbon soot by burning in this case is described in detail.

When the carbon soot deposited at the upstream surface of the exhaust gas filter ignites by an ignition plug or spark in the exhaust gas, the burning of the carbon soot propagates firmly on the plugs or clogging portions at the upstream end because a larger volume of carbon soot deposits in the grooves than on the surface of the plugs or clogging portions at the upstream end. Accordingly, the carbon soot deposited in the exhausted gas filter can completely burn out by the above described process. Therefore, even when small quantities of carbon soot is deposited, the carbon soot can completely burn in the exhaust gas filter, so that the large quantities of deposited carbon soot without ignition and filter breakdown caused by abnormally high temperatures can be prevented. In addition, a simple means like an ignition plug permits wide range burning propagation on the cell surface at the upstream end of the filter, and carbon soot deposited in the filter burns out completely to renew the filter.

As described above, the exhaust gas filter for a diesel engine according to the present invention permits reliable carbon soot ignition, complete carbon soot burn out and easy filter renewal. More specifically, the carbon soot deposits uniformly on the cell wall by providing narrow portions at the filter exit, thus preventing the filter breakdown caused by local temperature rising. In addition, by forming the narrow openings with plugs or clogging portions larger in area than the entrance or exit openings of the exhaust gas channel, the plugs or clogging portions can provide sufficient strength. When the narrow openings are formed by means of the tubular inserts, the cross-sectional area of the narrow opening can be easily reduced so that a large quantity of carbon soot can be deposited on the cell surface at the upstream end and at the same time, the carbon soot is deposited uniformly on the cell wall. The cycle of filter regeneration can be shortened by providing a thick wall portion at the portion of the cell wall adjacent the narrow opening. When a plurality of grooves are provided on the upstream cell wall surface exposed to the unfiltered exhaust gas, a large quantity of carbon soot deposits in the grooves and the carbon soot ignites easily and propagation of combustion is facilitated. In addition, when a material, mainly composed of ceramic fibers, is selected for the filter, the grooves can be formed during the filter production process and a separate process for forming the grooves is not required.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An exhaust gas filter for r diesel engine comprising:
   a corrugated sheet of porous ceramic material bonded to a flat sheet of porous ceramic material which together form a composite sheet, said composite sheet being wound in overlapping layers to form a honeycomb structure containing a plurality of cell channels formed by spaces between said corrugated sheet and said flat sheet for passage of exhaust gas therethrough which extend from an upstream end to a downstream end of said honeycomb structure with respect to the direction of flow of exhaust gas through said honeycomb structure; and
   a plurality of plugs, each of which is fitted into either said upstream end or said downstream end of each channel, said plugs being arranged such that every other one of said channels at the upstream end thereof is filled with one of said plugs and every other one of said channels at the downstream end thereof is filled with one of said plugs, with each of said channels being open at either said upstream end or said downstream end of said honeycomb structure, said plugs being of a porous ceramic material and each of said plugs having a cross-sectional area greater than the cross-sectional area of said cell channels through which exhaust gas passes.

2. The exhaust gas filter of claim 1, wherein said channels, which have plugs in openings therein at said downstream end of said honeycomb structure, have openings at said upstream end of said honeycomb structure which are smaller in cross-sectional area than the cross-sectional area of said openings in the same channels at said downstream end of said honeycomb structure.

3. The exhaust gas filter of claim 2, where said channels, which have plugs in openings therein at said upstream end of said honeycomb structure, have openings at said downstream end of said honeycomb structure which are smaller in cross-sectional area than the cross-sectional area of said openings at said upstream end of said honeycomb structure.

4. The exhaust gas filter of claim 3, wherein walls of said channels surrounding said plugs at said downstream end of said honeycomb structure are expanded radially outwardly by said plugs to form said smaller openings at said downstream end of said honeycomb structure.

5. The exhaust gas filter of claim 2, wherein walls of said channels surrounding said plugs at said upstream end of said honeycomb structure are expanded radially outwardly by said plugs thereby forming said smaller openings at said upstream end of said honeycomb structure.

6. The exhaust gas filter of claim 1, further comprising means for igniting carbon soot deposited on said upstream end of said honeycomb structure.

7. The exhaust gas filter of claim 6, wherein said igniting means comprises a glow plug.

8. The exhaust gas filter of claim 1, wherein grooves are provided in said upstream end of said honeycomb structure whereby a larger volume of carbon soot is deposited in said grooves than on said plugs located at said upstream end of said honeycomb structure thereby facilitating ignition of said carbon soot and propagation of combustion to completely burn up said carbon soot and thus regeneration of said filter.

9. An exhaust gas filter for diesel engine comprising:
   a corrugated sheet of porous ceramic material bonded to a flat sheet of porous ceramic material which together form a composite sheet, said composite sheet being wound in overlapping layers to form a honeycomb structure containing a plurality of cell channels formed by spaces between said corrugated sheet and said flat sheet for passage of exhaust gas therethrough which extend from an upstream end to a downstream end of said honeycomb structure with respect to the direction of flow of exhaust gas through said honeycomb structure; and
   a plurality of plugs, each of which is fitted into either said upstream end or said downstream end of each channel, said plugs being arranged such that every other one of said channels at the upstream end thereof is filled with one of said plugs and every other one of said channels at the downstream end thereof is filled with one of said plugs, with each of said channels being open at either said upstream end or said downstream end of said honeycomb structure, said channels having plugs in openings therein at said downstream end of said honeycomb structure also having openings at said upstream end of said honeycomb structure which are smaller in cross-sectional area than the cross-sectional area of said openings in the same channels at said downstream end of said honeycomb structure, and said channels having plugs in openings therein at said upstream end of said honeycomb structure also having openings at said downstream end of said honeycomb structure which are smaller in cross-sectional area than the cross-sectional aea of said openings in the same channels at said upstream end of said honeycomb structure.

10. The exhaust gas filter of claim 9, wherein said plugs at said upstream end of said honeycomb structure are of a porous ceramic material.

11. The exhaust gas filter of claim 9, wherein said plugs at said downstream end of said honeycomb structure are of a porous ceramic material.

12. The exhaust gas filter of claim 9, wherein walls of said channels surrounding said plugs at said upstream end of said honeycomb structure are expanded radially outwardly by said plugs thereby forming said smaller openings at said upstream end of said honeycomb structure.

13. The exhaust gas filter of claim 9, wherein walls of said channels surrounding said plugs at said downstream end of said honeycomb structure are expanded radially outwardly by said plugs to form said smaller openings at said downstream end of said honeycomb structure.

14. The exhaust gas filter of claim 9, wherein said channels, which are open at said upstream end of said honeycomb structure, each have a tubular insert therein forming said smaller openings at said upstream end of said honeycomb structure.

15. The exhaust gas filter of claim 9, wherein said channels, which are open at said downstream end of said honeycomb struture, each have a tubular insert therein forming said smaller openings at said downstream end of said honeycomb structure.

16. The exhaust gas filter of claim 9, wherein walls of said channels surrounding said plugs at said upstream end of said honeycomb structure are thickened and thus form said smaller openings at said upstream end of said honeycomb structure.

17. The exhaust gas filter of claim 9, wherein walls of said channels surrounding said plugs at said donwstream end of said honeycomb structure are thickened and thus form said smaller openings at said downstream end of said honeycomb structure.

18. The exhaust gas filter of claim 9, wherein grooves are provided in said upstream end of said honeycomb structure whereby a larger volume of carbon soot is deposited in said grooves than on said plugs located at said upstream end of said honeycomb structure thereby facilitating ignition of said carbon soot and propagation of combustion to completely burn up said carbon soot and thus regeneration of said filter.

* * * * *